May 9, 1933. W. M. KELLY 1,907,980
APPARATUS FOR DISCHARGING LUBRICANT UNDER PRESSURE
Filed Sept. 23, 1931
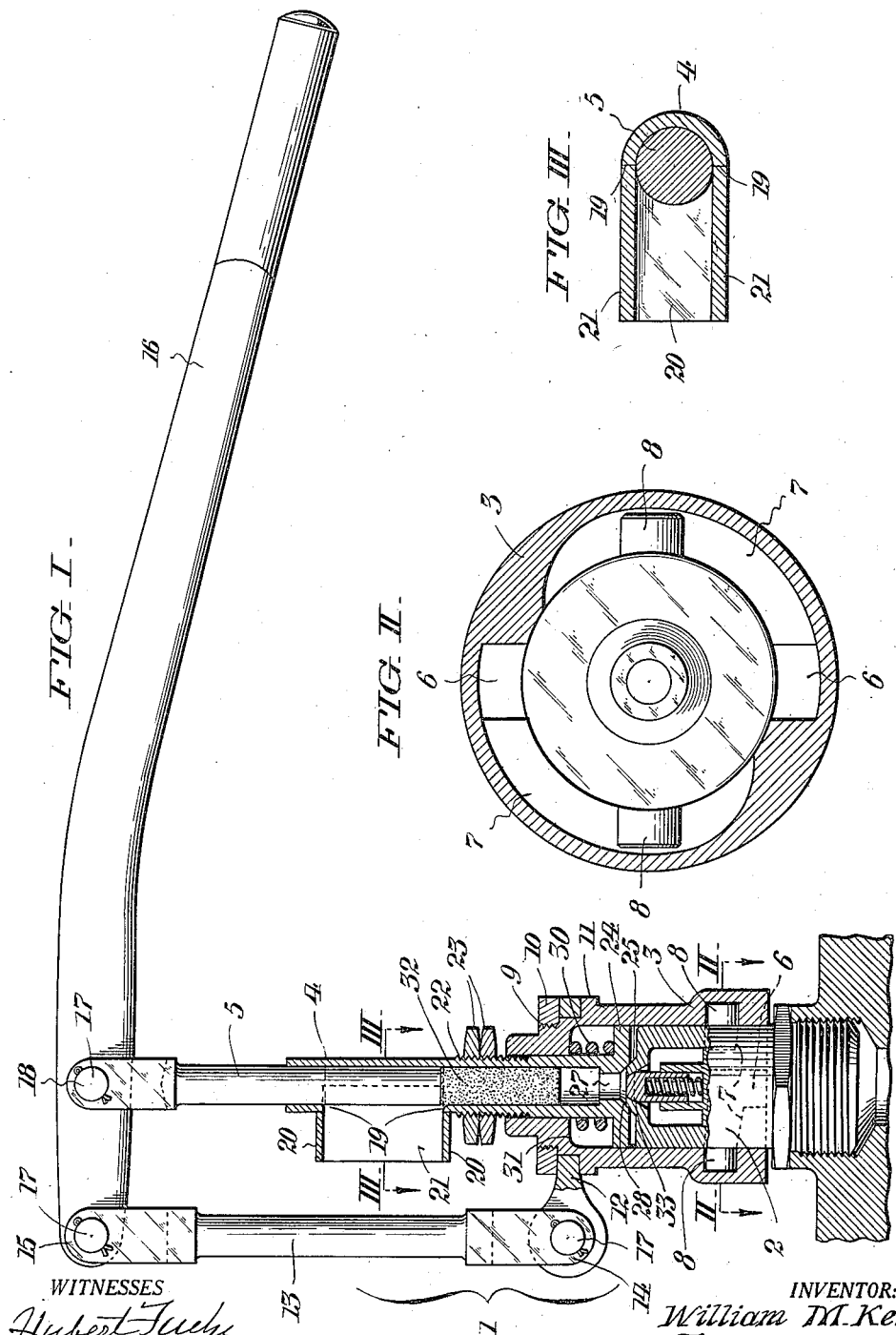

Patented May 9, 1933

1,907,980

UNITED STATES PATENT OFFICE

WILLIAM M. KELLY, OF PHILADELPHIA, PENNSYLVANIA

APPARATUS FOR DISCHARGING LUBRICANT UNDER PRESSURE

Application filed September 23, 1931. Serial No. 564,619.

This invention relates to apparatus for discharging lubricant under pressure, and more particularly to so-called "grease guns" adapted for interlocking connection with nipples or grease cups on parts to be lubricated.

The object of the invention is to provide, in apparatus of this nature, means for maintaining a tightly sealed joint between the fittings of the lubricant discharging and lubricant receiving devices, characterized by flexibility of adjustment and capacity for self-alignment between the parts of the joint. Heretofore difficulty has been experienced in maintaining the terminal fittings of grease guns in truly concentric relation to and in effective engagement with the companion fittings of grease cups. My invention overcomes this difficulty by a comparatively simple and inexpensive construction.

Other more specific objects and advantages characteristic of my invention will become more fully apparent from the description hereinafter of one embodiment or example thereof, the description having reference to the accompanying drawing, whereof:

Fig. I represents a side elevation, partly in section, of a grease gun of my invention applied to a grease cup.

Fig. II represents a cross section of the same, taken as indicated by the lines II—II of Fig. I; and, Fig. III represents a cross section of the same, taken as indicated by the lines III—III of Fig. I.

In the drawing, the grease gun selected for illustration as an example of my invention is comprehensively designated at 1, and is shown in operative association with a grease cup similarly designated at 2. The grease cup 2, while forming no part of the present invention, is one which is especially adapted for use in connection with the particular grease gun herein selected for description.

The grease gun shown in the drawing comprises generally a body portion 3, which defines a cylindrical chamber and which is adapted for interlocking connection with the grease cup 2, a cylinder 4 movable within said chamber, and a plunger 5 operable within the cylinder 4 to force the lubricant through the cylinder 4 and into the grease cup 2. At its lower end the chamber 3 is provided, as shown in Figs. I and II, with rectangular slots 6 at diametrically opposite positions, the slots leading vertically upward to internal helical grooves 7. In an obvious manner the pin 8 extending outward from the walls of the grease cup 2 enters within the openings 6 and grooves 7 when the grease gun is applied to the cup and is turned to lock the parts together. At its upper end the chamber 3 is externally threaded at 9 and is provided with a nut 10. Between the nut 10 and a shoulder 11 on the body 3 of the grease gun there is held in place a yoke bracket 12. On the yoke bracket 12 there is pivotally mounted a link 13 having bifurcated lower and upper ends 14 and 15 connected respectively to the yoke bracket 12 and a lever arm 16 by means of pins 17. Intermediate the ends of the lever 16, the bifurcated end 18 of the plunger 5 is joined to the arm by another pin 17. The lever or operating arm 16 is actuated in the manner of a pump handle to effect reciprocation of the plunger 5 within the cylinder 4, and thus to cause the lubricant to be forced under pressure into the grease cup 2.

The cylinder 4 is provided at its upper end with a rectangular opening 19 bounded by horizontal and vertical plates 20, 21 through which the charge of lubricant is inserted. Preferably the lubricant is prepared in preformed plastic cakes of a size so that the cakes may be conveniently inserted by hand into the interior of the cylinder 4. Below the opening 19 the cylinder 4 is externally threaded, as indicated at 22, and the threads are engaged by a pair of nuts 23 which limit the movement of the cylinder with respect to the chamber 3. At its lower end the cylinder 4 terminates in a head portion 24 which is in the form of a flat plate and which serves as a seat adapted to be engaged by the top face 25 of the grease cup 2. The head portion 24 of the cylinder 4 has a central opening 27 and a chamfered surface 28 adjacent to the opening, the surface 28 being conical and adapted to be engaged by a conical surface 25 at the top of the grease cup.

A helical spring 30 is disposed between the head portion 24 of the cylinder 4 and the neck 31 at the top of the body portion 3 of the grease gun. The spring 30 serves to urge the head portion 24 of the cylinder 4 toward the conical face 25 of the grease cup when the grease gun is applied to the grease cup.

When the grease gun 1 is to be applied to a grease cup 2, the body portion 3 of the grease gun is turned to the point where the rectangular slots 6 are in line with and immediately above the ends of the pin 8. The body portion 3 of the grease gun is then pressed downward and turned with the pin 8 engaging in the helical grooves 7. As the body portion 3 revolves, the conical face 25 of the grease cup moves inward within the chamber into engagement with the conical seat 28 at the head of the cylinder 4 and compresses the spring 30. Accordingly, not only is a tight mechanical interlock effected between the grease cup and grease gun, but also the head 24 of the cylinder 4 is maintained in pressure engagement with the conical face 25 on the grease cup. Furthermore, the head portion 24 of the cylinder 4 by virtue of its conical surface 28, is self-seating on the corresponding surface 25 of the grease cup; and thus the cylinder 4 is necessarily maintained in truly concentric relation with the grease cup 2.

When the grease gun has been thus applied, it is ready for operation. Thereupon the lever or operating arm 16 is elevated to raise the plunger 5 to the top of the cylinder 4, and a cake of lubricant is inserted within the opening 19 to a position as indicated at 32 immediately below the bottom end of the plunger. Preferably the cakes are of a width corresponding to the inside diameter of the cylinder. As the plunger 5 descends, by pressing down on the operating arm 16, the cake of lubricant is forced downward into the lower end of the cylinder 4. With further descent of the plunger 5, the lubricant is forced through the narrow opening 27 into the chamber of the grease cup 2 through the valve 33.

The pair of nuts 23 serve not only to hold the cylinder 4 within the body 3 of the grease gun, but also provide a means of adjustment by which the head 24 of the cylinder may be adjusted to a normal position within the chamber 3 at the desired distance from the helical grooves 7.

From the above description it will be apparent that a tightly sealed joint is effected between the interlocking fittings of the lubricant discharging and lubricant receiving devices, and that the parts are automatically brought into alignment with each other.

While I have described a particular embodiment of my invention in a grease gun, it will be apparent that various changes may be made in the form of the embodiment herein described and illustrated without departing from the spirit of the invention as defined in the claims hereto annexed.

Having thus described my invention, I claim:—

1. In a device for discharging lubricant under pressure, a chamber adapted to interlock with a fitting on the apparatus to be lubricated, a cylinder movable in said chamber, said cylinder terminating in a seat member adapted to engage the fitting to be lubricated, a spring interposed between a portion of said chamber and said seat member, and a plunger operable within said cylinder to force lubricant therethrough.

2. In a device for discharging lubricant under pressure, a chamber adapted to interlock with a fitting on the apparatus to be lubricated, a cylinder movable in said chamber and terminating in a seat member, said seat member having a flat face with an opening therethrough and a chamfered surface adjacent said opening adapted to engage a corresponding surface of said fitting, a spring interposed between a portion of said chamber and said seat member, and a plunger operable within said cylinder to force lubricant therethrough.

3. In a device for discharging lubricant under pressure, a chamber adapted to interlock with a fitting on the apparatus to be lubricated, a cylinder movable with respect to said chamber and having a head portion serving as a seat for said fitting, a spring interposed between a portion of said chamber and said head portion of the cylinder to urge the latter toward said fitting, and a plunger operable within said cylinder to force lubricant therethrough.

4. In a device for discharging lubricant under pressure, a cylindrical chamber adapted to interlock with a fitting on the apparatus to be lubricated, a cylinder movable with respect to said chamber and having a head portion serving as a seat for said fitting, said head portion being guided in its movement by the inner wall of said chamber, a spring interposed between a portion of said chamber and said head portion of the cylinder to urge the latter toward said fitting, and a plunger operable within said cylinder to force lubricant therethrough.

5. In a device for discharging lubricant under pressure, a chamber adapted to interlock with a fitting on the apparatus to be lubricated, an externally threaded cylinder movable in said chamber and having a head portion serving as a seat for said fitting, a nut engaging the threads of said cylinder and limiting its movement with respect to said chamber, a spring urging said head portion toward said fitting, and a plunger operable within said cylinder to force lubricant therethrough.

6. In a device for discharging lubricant under pressure, a chamber adapted to interlock with a fitting on the apparatus to be lubricated, a cylinder movable in said chamber and terminating in a seat for said fitting, a spring urging the seat of said cylinder through said chamber toward said fitting, a plunger operable within said cylinder to force lubricant therethrough, a link mounted on said chamber, and an operating arm pivoted to said link and plunger.

7. In a device for discharging lubricant under pressure, a chamber adapted to interlock with a fitting on the apparatus to be lubricated, a cylinder movable in said chamber and terminating in a seat for said fitting and having an opening in the side wall thereof for the admission of the lubricant, a spring urging the seat of said cylinder toward said fitting, a plunger operable within said cylinder to force lubricant therethrough, a link mounted on said chamber, and an operating arm pivoted to said link and plunger.

In testimony whereof I have hereunto signed my name at Philadelphia, Pennsylvania, this 8 day of September, 1931.

WILLIAM M. KELLY.